(12) United States Patent
Våga et al.

(10) Patent No.: US 12,479,548 B2
(45) Date of Patent: Nov. 25, 2025

(54) PUMPING OPERATIONS USING UNDERWATER VEHICLES

(71) Applicant: DeepOcean AS, Haugesund (NO)

(72) Inventors: Vegard Våga, Førresfjorden (NO); Joar Størksen, Haugesund (NO); Vidar Gressvoll Berge, Kolnes (NO)

(73) Assignee: DeepOcean AS, Haugesund (NO)

( * ) Notice: Subject to any disclaimer, the term of this patent is extended or adjusted under 35 U.S.C. 154(b) by 588 days.

(21) Appl. No.: 17/914,491

(22) PCT Filed: Mar. 25, 2021

(86) PCT No.: PCT/NO2021/050082
§ 371 (c)(1),
(2) Date: Sep. 26, 2022

(87) PCT Pub. No.: WO2021/194355
PCT Pub. Date: Sep. 30, 2021

(65) Prior Publication Data
US 2023/0115886 A1   Apr. 13, 2023

(30) Foreign Application Priority Data

Mar. 26, 2020   (NO) .................................. 20200359

(51) Int. Cl.
| | | |
|---|---|---|
| *B25J 11/00* | (2006.01) | |
| *B25J 13/00* | (2006.01) | |
| *B25J 15/00* | (2006.01) | |
| *B25J 15/06* | (2006.01) | |
| *B63G 8/00* | (2006.01) | |

(52) U.S. Cl.
CPC ............... *B63G 8/001* (2013.01); *B25J 11/00* (2013.01); *B25J 13/006* (2013.01); *B25J 15/0019* (2013.01); *B25J 15/0616* (2013.01); *B63G 2008/005* (2013.01)

(58) Field of Classification Search
CPC .. B63G 8/00; B63G 8/001; B25J 11/00; B25J 13/00; B25J 13/006; B25J 15/00; B25J 15/0019; B25J 15/0616
USPC ........................................................ 114/313
See application file for complete search history.

(56) References Cited

U.S. PATENT DOCUMENTS

| | | |
|---|---|---|
| 1,535,209 A | 4/1925 | Dubbs |
| 3,593,408 A | 7/1971 | Walker |
| 4,138,147 A | 2/1979 | Manchester et al. |
| 4,502,407 A | 3/1985 | Stevens |

(Continued)

FOREIGN PATENT DOCUMENTS

| | | |
|---|---|---|
| EP | 3444428 | 2/2019 |
| WO | 2016/178045 A1 | 11/2016 |

OTHER PUBLICATIONS

Norwegian Search Report for 20200359, dated Aug. 28, 2020.
International Search Report and the Written Opinion for PCT/NO2021/050082, mailed Jul. 19, 2021.

*Primary Examiner* — Lars A Olson
(74) *Attorney, Agent, or Firm* — ANDRUS INTELLECTUAL PROPERTY LAW, LLP

(57) ABSTRACT

A remote operated underwater vehicle, ROV, is provided, where the ROV includes at least one extendible pair of tubulars supported on the ROV, the one tubular of the pair being movable longitudinally relative to the other tubular of the pair, for extending a combined reach of the tubulars; and at least one pump connected to the tubulars, the pump being operable for pumping or suctioning fluid through the pair.

20 Claims, 3 Drawing Sheets

(56) References Cited

U.S. PATENT DOCUMENTS

2002/0122696 A1 9/2002 Clark et al.
2002/0139287 A1 10/2002 Chase
2014/0305654 A1 10/2014 Lugo

PUMPING OPERATIONS USING UNDERWATER VEHICLES

CROSS-REFERENCE TO RELATED APPLICATIONS

This application is the U.S. national stage application of International Application PCT/NO2021/050082, filed Mar. 25, 2021, which international application was published on Sep. 30, 2021, as International Publication WO 2021/194355 in the English language. The International Application claims priority of Norwegian Patent Application No. 20200359, filed Mar. 26, 2020. The international application and Norwegian application are both incorporated herein by reference, in entirety.

TECHNICAL FIELD

The present invention relates to subsea operations and, in particular, relates to pumping or suctioning operations, and related methods, apparatus, and an underwater vehicle, e.g. an ROV. In various examples, the underwater vehicle is used for connecting tubulars from pump equipment to an underwater structure.

BACKGROUND AND PRIOR ART

In various underwater operations, there can be a need for fluid to be pumped in or suctioned out of a marine structure. Such a structure may be installed for long term use, for example on the seabed. A suction foundation or anchor may be installed on the seabed, as is sometimes done in the oil and gas industry for providing a support structure for a wellhead of a subsea well. Suction may need to be applied over time to draw out fluid and lower the pressure of the fluid inside the foundation to allow the suction foundation to be driven efficiently into and installed in place in the seabed. In such an installation process, suction may need to be applied to secure to foundation into place in the seabed quickly and efficiently. To this end, substantial lowering of the pressure inside the structure may be needed. Foundations may be provided with a manifold providing for a fluid connection through to the inside of the foundation for pumping out fluid.

It can be convenient to use a remote operated vehicle (ROV) to perform certain underwater operations or tasks, and the inventors note that an ROV may be useful onsite to assist with installing a suction foundation. ROVs have in the past been equipped with pumps and hoses for pumping fluids. However, these have been found to have performance limitations in practice as to fluid rates and pressure differentials attainable before the hoses collapse and consequently existing pump and hose solutions may not be well suited to underwater operations such as for pumping out fluid for installing suction foundations. Operations reliant on existing pumping solutions can thus be hampered by slow progress.

There is sought an improved solution to pump in and/or suction fluid out of an underwater structure with greater reliability, speed and/or efficiency.

SUMMARY OF THE INVENTION

According to a first aspect of the invention there is provided an underwater vehicle for performing an underwater pumping or suctioning operation, the underwater vehicle comprising: rigid tubing which comprises at least one extendible pair of tubulars, supported on the underwater vehicle, the one tubular of the pair being movable longitudinally relative to the other tubular of the pair, for extending a combined reach of the tubulars; and at least one pump coupled to the rigid tubing, the pump being operable for pumping or suctioning fluid through the pair of tubulars.

In this way, a suitable combined reach of the tubulars may conveniently be obtained by operating the extendible pair. For example, the underwater vehicle may be positioned near an underwater structure, and the extendible pair of tubulars may be operated to extend toward a connector, e.g. port, on the underwater structure to connect to it. An end member supported distally on the tubulars may in such way be moved into contact with a target underwater structure for obtaining a fluid communicating connection. The rigid tubing may provide fluid communication between the pumps and an underwater structure. Once connected, fluid, e.g. water may be pumped in or suctioned out from the underwater structure through the tubing, using the pumps. The rigid tubing and extendible pair of tubulars may advantageously facilitate collapse resistant coupling of the pumps to the underwater structure.

Typically, the underwater vehicle is a remote operated underwater vehicle, ROV.

The rigid tubing may comprise a structure which upon suctioning in use is resistant to collapse by one or more pressures exerted against an exterior of the tubing that is one atmosphere, or more than one atmosphere, greater than inside the tubing.

Typically, the one tubular comprises a (tubular) mandrel and the other tubular comprises (tubular) sleeve. The one tubular and/or the other tubular may comprise or consist essentially of metal, e.g. comprise metal pipe. Alternatively, the tubulars of the pair may either or both comprise or consist substantially of rigid and/or stiff material(s). This may provide collapse resistance. The sleeve may for example comprise a uniform section of 5-inch internal diameter pipe. The mandrel may for example comprise a uniform section of 3-inch internal diameter pipe.

The one tubular may typically be movable relative to the other by linear translation. The tubulars of the pair are arranged so that part of the one tubular is arranged within the bore of the other tubular, for sliding movement of the one relative to the other.

The one tubular may be arranged distally of the other tubular of the pair. The distal tubular may be the sleeve. The tubulars may include a bendable stub shorter in length than either or both of the tubulars of the pair. The bendable stub may preferably be coupled to a distal end of the distal tubular.

An end portion of the tubing may be arranged for engaging with a part of the underwater structure for connection thereto. For example, the tubulars and/or tubing may be provided with a nose end member for engaging with a connector of an underwater structure. The nose end member may have ports for communicating with an interior of the underwater structure for fluid to be inserted or extracted from the interior through the ports and into the tubulars and/or tubing.

A motor may be provided to be operable for actuating the extendible pair of tubulars. The motor may be fastened/connected fixedly in place to the one of the tubulars of the pair. The motor may be coupled to a threaded rod. The threaded rod may be passed, more specifically threaded, through a nut. The nut may be coupled fixedly to the one or the other tubular of the extendible pair. The motor may be operable to turn the rod through the nut for moving the one tubular relative to the other. The threaded rod may preferably be arranged to extend in parallel along the tubulars of the pair. This may facilitate stability and support for the rod.

The underwater vehicle may be provided with one or more pumps, e.g. two pumps, which may operate in parallel. The parallel pumps may be fluidly connected to a common pipe which may be supported on a frame of the underwater vehicle, e.g. through a pipe Y section. The pipe supported on the frame of the underwater vehicle may comprise 3-inch internal diameter pipe.

According to a second aspect of the invention, there is provided apparatus comprising: rigid tubing which comprises at least one extendible pair of tubulars to be supported in position underwater, the one tubular of the pair being movable longitudinally relative to the other tubular of the pair, for extending a combined reach of the tubulars; and at least one pump to be coupled to the rigid tubing, the pump to be operable for pumping or suctioning fluid through the pair of tubulars.

The apparatus may comprise at least one connector, e.g. at least one stab, for connecting to an ROV for operating the apparatus. The connector may be configured to communicate any of fluids, electrical current, and/or data services.

According to a third aspect of the invention, there is provided a system comprising: the apparatus as set out in the second aspect of the invention; and an underwater vehicle. The system may further comprise an underwater structure. The system may further comprise a deployment device, e.g. crane. The deployment device may have at least one deployment line. The apparatus may be attached to the deployment line. The deployment line may be operable for lifting or lowering the apparatus into location underwater and supporting the apparatus in the location. The lifting/lowering device may be supported on a surface vessel.

According to a fourth aspect of the invention, there is provided a method of using the underwater vehicle as set out in accordance with the first aspect of the invention or using the apparatus as set out in accordance with the second aspect of the invention. The method may comprise any one or more of the steps of: actuating the extendible pair of tubulars; moving the one tubular of the pair longitudinally relative to the other tubular of the pair; obtaining a connection with an underwater target structure for fluid communication through the tubulars; and operating the pump(s) for suctioning fluid from or pumping fluid into the underwater structure through the tubulars. The method may include supplying the apparatus, e.g. the pump and/or an actuator for operating the pair of tubulars, with any one or more hydraulic power, electrical connection, and/or communications services.

The apparatus may be incorporated on the underwater vehicle. Alternatively, the method may include supporting the apparatus from a deployment device, e.g. on a deployment line separate from the underwater vehicle. The method may include lowering the apparatus into a location underwater in proximity to an underwater structure. After lowering the apparatus into the location underwater, the method may further include manoeuvring the underwater vehicle to position the underwater vehicle in proximity to the apparatus supported from the deployment device, e.g. suspended on the deployment line. The method may then include connecting the underwater vehicle to the apparatus underwater, e.g. by engaging an underwater connector, e.g. a stab, of the apparatus. The method may further include using the underwater vehicle to operate the apparatus to extend the reach of the extendible pair of tubulars to connect the apparatus to the underwater structure. Once connected to the underwater structure, the method may further comprise using the underwater vehicle to operate the pump. The method may include delivering services, e.g. electrical, hydraulic, and/or communications through the connector, e.g. stab, connection, to operate the apparatus, e.g. perform pumping and/or extend the reach of the pair of tubulars. The underwater vehicle may typically be an ROV, e.g. a work ROV.

Accordingly, the underwater vehicle may be used in an underwater pumping or suctioning operation. The underwater vehicle may be operated or may operate the apparatus to obtain a connection between an underwater structure and the tubing for pumping fluid into or suctioning fluid out of the underwater structure.

In another aspect of the invention, there is provided an underwater vehicle comprising: at least one extendible pair of tubulars supported on the vehicle, the one tubular of the pair being movable longitudinally relative to the other tubular of the pair, for extending a combined reach of the tubulars; and at least one pump coupled to the tubulars, the pump being operable for pumping or suctioning fluid through the pair of tubulars.

In another aspect of the invention, there is provided an underwater vehicle, for performing an underwater pumping or suctioning operation upon connection to an underwater structure, the underwater vehicle comprising: rigid tubing; at least one extender for extending a reach of the tubing for obtaining connection of the tubing to the underwater structure; and at least one pump coupled to the tubing for pumping in or suctioning fluid out the underwater structure when connected. Preferably, the extender may comprise at least one extendible pair of tubulars.

Any of the abovementioned aspects of the invention may include any one or more further features as set out herein or as set out in relation to any other aspect wherever described herein.

Embodiments of the invention are advantageous in various ways as will be apparent from the specification throughout.

DRAWINGS AND DESCRIPTION

There will now be described, by way of example only, embodiments of the invention, with reference to the accompanying drawings, in which.

Figure 1:
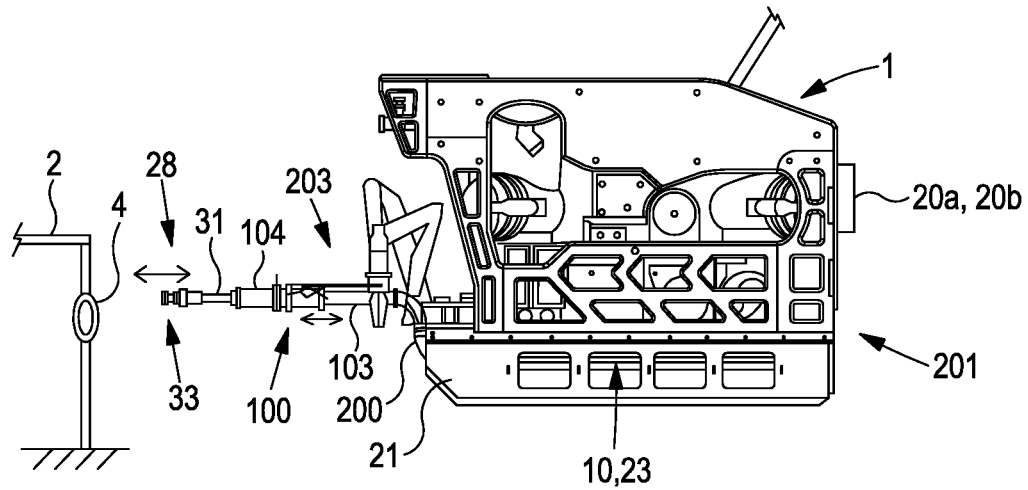
FIG. 1 is a side-view of an ROV provided with apparatus for connecting to an underwater structure.
Figure 2:
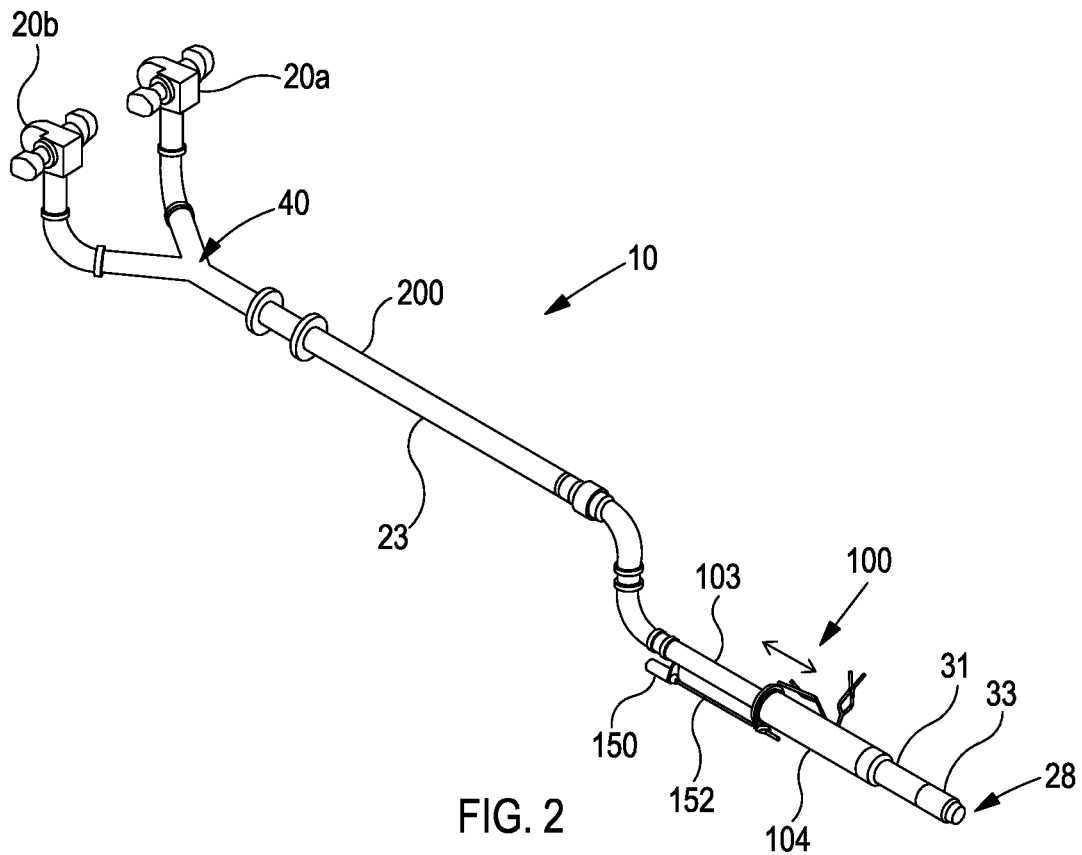
FIG. 2 is a perspective view of the apparatus including and extender device for connecting to an underwater structure isolated from the ROV in larger scale.

With reference to FIGS. 1 and 2, an underwater vehicle in the form of a work ROV 1 is provided. The ROV is equipped with apparatus 10 for connecting to an underwater structure 2. The ROV has thrusters for steering and positioning and is remotely controlled by an operator from surface using cameras etc.

Two pumps 20a, 20b are supported on a frame 21 of the ROV toward a rear part 201 of the frame 21. Rigid tubing 200 is provided on the ROV for coupling and providing fluid communication between the pumps 20a, 20b and the underwater structure 2, when connected. The tubing 200 includes pipes 22a, 22b, intermediate pipe 23, and extendible tubulars of a tubular extender 100, as will be described in further detail below.

More specifically, the pumps 20a, 20b are provided with individual pipes 22a, 22b which connect through a Y section 40 to an intermediate pump connecting pipe 23. The intermediate pipe 23 is fixed to and supported by the frame 21. The intermediate pipe 23 runs from the rear part 201 toward a front part 203 of the frame 21. Moving distally away from the front part of the frame, the intermediate pipe 23 is coupled to a tubular extender 100 which in turn is coupled to a hose stub 31 which in turn is coupled to a distal end member 33 at or near the end of the tubing 200.

In use, the end member 33 is inserted into a port 4 of the structure 2. The pumps 20a, 20b are operated to suction water out of the subsea structure 2. In so doing, the water being extracted from the structure 2 flows through connecting ports into the end member 33 and through the rigid tubing 200 onward toward the pumps 20a, 20b. The water travels along the interior passageway through hose stub 31, the tubular extender 100, the intermediate pipe 23 and Y section 40 to the pumps 20a, 20b.

The extender 100 comprises an extendible pair of tubulars, and has an elongate tubular structure. The extender 100 includes a tubular sleeve 104 which is coupled to a tubular mandrel 103. The sleeve 104 fits slidably around the mandrel 103, in "pipe-in-pipe" relationship. By operation of the extender 100, the sleeve 104 is movable longitudinally, in this example linearly translatable, along the mandrel 103. The length of the extender device 100 may thus be increased and the end member 33, by virtue of being connected to the tubular sleeve 104, is then extended to a greater reach for facilitating stab connection to the structure. The extender device 100 is operable also to reduce in length so that the end member then is retracted away and disconnected from the underwater structure 2.

The respective bores 103i, 104i of the mandrel 103 and sleeve 104 together form a connected interior passage through the extender structure 100 for communicating water through the structure at different amounts of extension.

The rigid tubing 200 for coupling and providing fluid communication between the pumps and the underwater structure advantageously provides resistance against collapse. Such rigidity is facilitated by the extender 100. The mandrel 103 and tubular sleeve 104 together provide an extended reach from the ROV through the water for facilitating the connection and bringing the end member 33 into proximity to the target subsea structure. The stub 31 can provide some bendability or give in the structure to help operators of the ROV to achieve the stab connection and avoid a brittle structure that otherwise may be undesirably sensitive or susceptible to damage in the event of ROV motions or small misalignments during stab-in. The stub 31 is generally only a small fraction of the length of the tubular sleeve 104 and/or mandrel 103, and/or is typically shorter in length than the internal diameter of the tubular sleeve 104 and/or the mandrel 103, thereby to maintain good performance under high pressure differential operations.

Figure 3:
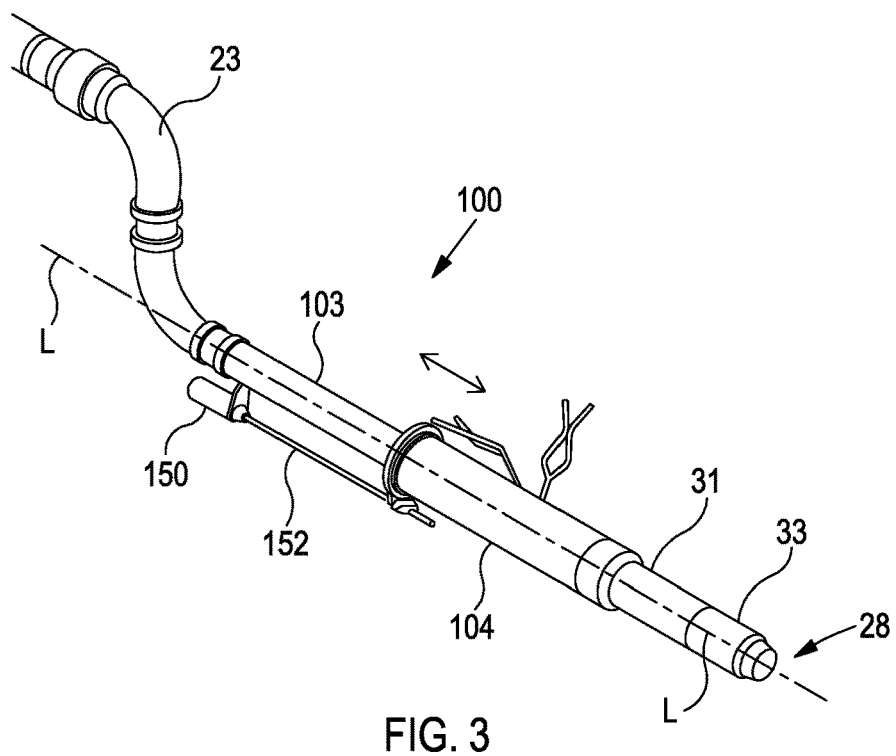
FIG. 3 is a perspective view of the extender in larger scale.
Figure 4:
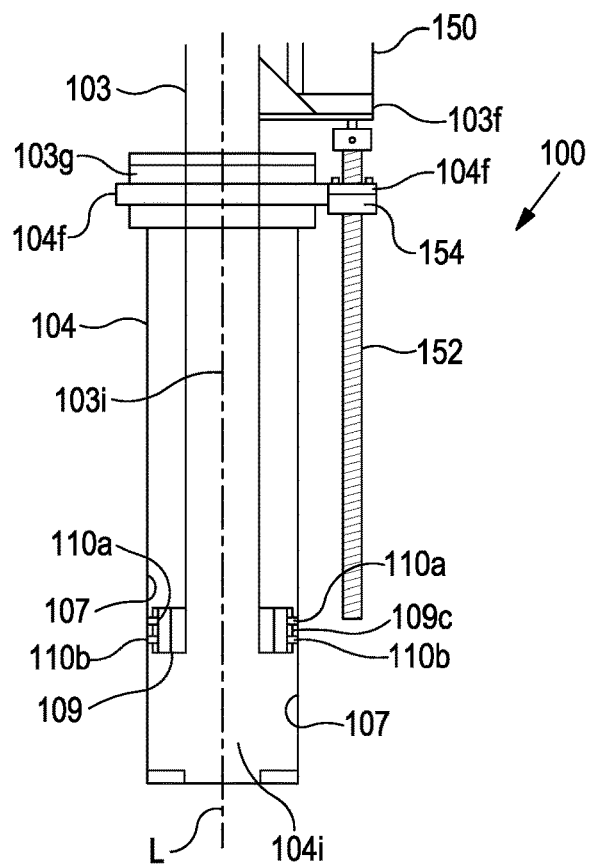
FIG. 4 is a sectional view of the extender in yet larger scale.

In more detail and additionally now referring to FIGS. 3 and 4, the sleeve 104 and the mandrel 103 are arranged coaxially on the axis L. The mandrel 103 has an end portion arranged within the sleeve 104 with pressure tight annular ring seals 110a, 110b arranged between an outer surface of the mandrel and an inner surface of the sleeve. The seals 110a, 110b are sliding seals that accommodate relative linear translational movement of the sleeve 104 axially with respect to the mandrel 103.

The extender device 100 includes a hydraulic motor 150. The hydraulic motor 150 is fastened in place to an outwardly protruding formation 103f of the mandrel 103. The hydraulic motor 150 is operable to turn a threaded rod 152. The threaded rod 152 extends along and parallel to the axis L of the sleeve 104 and mandrel 103. The rod is passed through a complementarily threaded nut 154 which is held fixed in place on an outwardly protruding formation flange 154f of the sleeve 104. By rotating the threaded rod 152, the nut 154 is forced to travel along the threaded rod 152 which in turn drives the tubular sleeve 104 to be translated along the tubular mandrel 103 for extending or retracting the sleeve 104. Operation of the motor 150 to produce rotation in one direction causes extension and in the opposite direction causes retraction. The operation using the threaded rod 152 and nut 154 facilitates fine control and gradual extension of the tubular sleeve 104.

The seals 110a, 110b are arranged on a head 109 which comprises a thickened cylindrical wall 109c section which fits with close tolerance the internal bore 104i of the sleeve 104. The seals 110a, 110b are arranged around the wall section 109c between an outer surface thereof and a wall 107 of the bore 104i. The cylindrical wall section 109c has a length that provides stability and robust structure to the extender device, and for example may help resist bend moments.

The threaded rod 152 extending in parallel along mandrel 103 and sleeve 104 also adds support for the sleeve 104 laterally, to facilitate stability and resistance against bend forces, in particular when in the sleeve 104 is in extended position.

The pumps 20a, 20b are identical underwater centrifugal pumps, arranged to operate in parallel to suction water through a common pipe 23. Using several pumps in parallel can enhance the pumping effect and suction. In applications for suctioning, the pumps operate to suction water through the intermediate pipe 23. They can perform for instance to lower the pressure in the fluid being extracted compared with the surrounding environment.

The pumps 20a, 20b are operated hydraulically. The pumps 20a, 20b can operate in opposite sense, to pump fluid through the pipe 23 and into a connected subsea structure, in other examples. The pumps operate to produce a flow through the tubulars of over 200 litres per minute.

The rigid tubing 200 includes pipework of rigid pipes and/or tubular elements which connect, e.g. by flanges, to the pumps 20a, 20b and are affixed in permanent position to the frame of the ROV. The pipe 23 comprises three-inch internal diameter pipe. The mandrel 103 also comprises three-inch internal diameter pipe and has uniform internal diameter section, additionally provided with the head 109 etc, as mentioned above. The mandrel 103 is flange to flange connected to the pipe 23. The sleeve 104 comprises five-inch internal diameter pipe. Both the mandrel 103 and the sleeve 104 are straight tubulars preferably comprising or consisting essentially of metal, e.g. preferably comprising or consisting essentially of steel.

Although only one sleeve 104 is shown in various examples of the extender device 100, the extender device may in other examples have further tubular sections which extend longitudinally by movement one relative to another.

Also, although the extender device is shown in various examples to extend its reach laterally from the ROV, it may in other examples be oriented in another orientation by appropriate arrangement of the intermediate pipe 23, e.g. to extend vertically.

Figure 5:
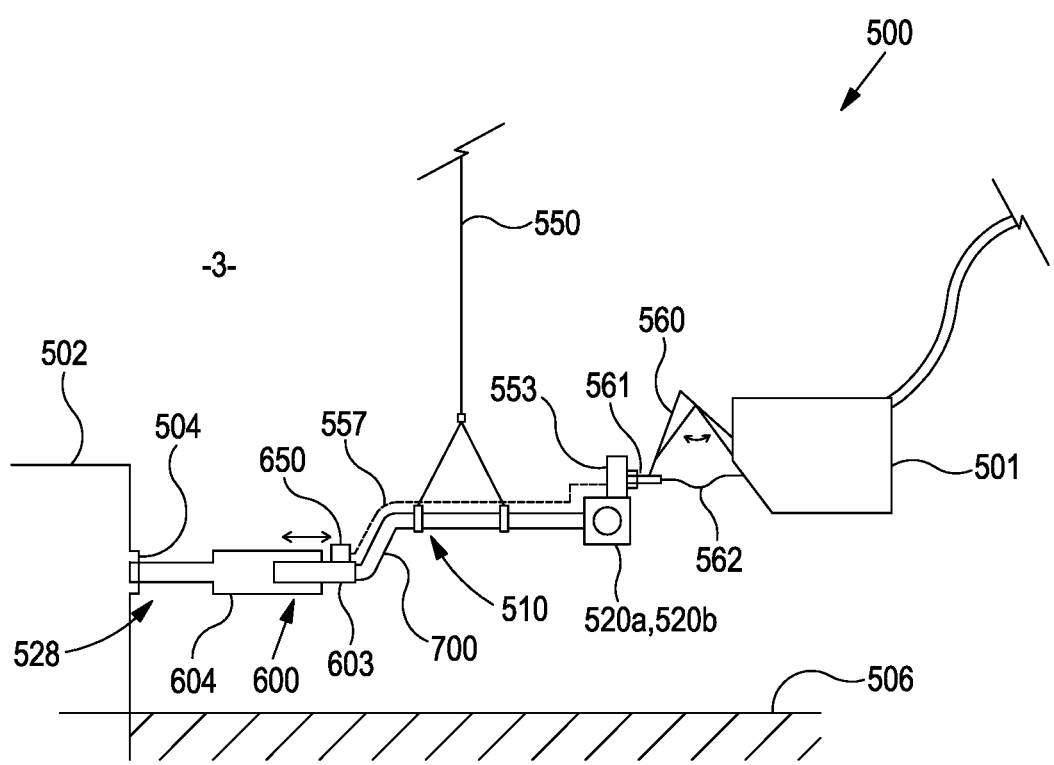
FIG. 5 is a schematic view of a system in use including an underwater vehicle and pumping equipment suspended separately in the sea.

In FIG. 5, a system 500 is depicted where the apparatus 510 comprising the pumps 520a, 520b, the rigid tubing 700, and the extender 600 is deployed on a crane from a surface vessel (not shown) and supported on a crane line 550 in an underwater location in the sea 3. Corresponding features to those of FIGS. 1 to 4 have the same reference numerals incremented by five hundred.

After the apparatus 510 is lowered down into the sea 3 using the crane, the ROV 501 connects to the apparatus 510 through the stab 553. This establishes a connection between the ROV 501 and the apparatus 510 for providing for example power, communications, and hydraulics for operating the apparatus 510, in particular the pumps 520a, 520b and the motor 650 for operating the extender 600. The ROV 501 has for example a manipulator 560 which is used to position a connector 561 into engagement with the stab 553 on the apparatus 510 so that power, data and/or fluids can be communicated from the ROV to the motor of the extender 650 and the pumps 520a, 520b. The motor 650 connects with the stab 553 through line 557 for providing the necessary comms, power, or fluids services for operation.

The ROV 501 can also help to manipulate the position of the apparatus 510. For example, a manipulator on the ROV 501 can nudge or urge part of the apparatus 510 laterally, e.g. to facilitate alignment of the end of the tubing 700 with the port 504 of an underwater structure 502 on the seabed 506.

As can be appreciated, the apparatus 510 can conveniently be deployed in some examples separately from the ROV 501. The tubing system and pumps are then not fixedly attached to or do not need to be carried by the ROV 501 into position. However, the ROV 501 can connect as and when required through connection 562. This may be a more efficient or convenient way to deploy the equipment and perform pumping and/or suctioning operations.

The examples described above can be advantageous in various ways. The rigid structure of tubing or piping between the pumps and the underwater structure avoids the need for hoses and can handle significant pressure from the subsea environment, as may be exerted against an exterior of a pipe section upon lowering the pressure inside the pipe section when suctioning. The piping can readily withstand pressure difference (the pressure outside minus the pressure inside) against the exterior of the pipes in the region of one atmosphere or more. Accordingly, the present technique can allow subsea pumping operations to take place with suction pressures inside the tubing significantly lower (and consequently a larger pressure difference) than previously possible. This can result in higher rates of pumping and extraction in subsea pumping operations. The arrangement of the sleeve 104 and mandrel 103 cooperating together can provide robustness and stability for helping to control the extension and retraction of the end member and facilitate the connection of the tubing system to the underwater structure. The sleeve 104 and mandrel 103 of the extender 100 maintains rigidity in the reach from the ROV to the underwater structure, and similarly can withstand high pressure differentials. The arrangement may thus facilitate resistance to collapse, where long flexible hoses are not needed, as the reach from the ROV toward the underwater structure may be obtained by the extender device. Due to non-collapse and rigid characteristics, the rigid tubing with extender device solution exemplified herein may also be easier to maintain, robust, and less susceptible to wear.

Various modifications and improvements may be made without departing from the scope of the invention herein described.

The invention claimed is:

1. An underwater vehicle for performing an underwater pumping or suctioning operation, the underwater vehicle comprising:
rigid tubing which comprises at least one extendible pair of tubulars supported on the underwater vehicle, the one tubular of the pair being movable longitudinally relative to the other tubular of the pair, for extending a combined reach of the tubulars;
at least one pump coupled to the rigid tubing, the pump being operable for pumping or suctioning fluid through the pair of tubulars; and
a motor operable for actuating the extendible pair.

2. The underwater vehicle as claimed in claim 1, wherein the rigid tubing is resistant to collapse by a pressure against an exterior of the tubing that is one atmosphere, or more than one atmosphere, greater than inside the tubing.

3. The underwater vehicle as claimed in claim 1, wherein the one tubular comprises a mandrel and the other tubular comprises sleeve.

4. The underwater vehicle as claimed in claim 1, wherein the one tubular comprises or consists essentially of metal cylindrical walling.

5. The underwater vehicle as claimed in claim 1, wherein the one tubular is movable relative to the other by linearly translation.

6. The underwater vehicle as claimed in claim 1, wherein the tubing has an end member for engaging with a connector of an underwater structure.

7. The underwater vehicle as claimed in claim 1, wherein the motor is coupled to a threaded rod which is threaded through a nut which is coupled fixedly to the one or the other tubular of the pair, the motor being operable to turn the rod through the nut for moving the one tubular relative to the other.

8. The underwater vehicle as claimed claim 7, the threaded rod arranged to extend in parallel along the tubulars of the pair.

9. The underwater vehicle as claimed in claim 1, comprising parallel pumps which are fluidly connected to a common or intermediate pipe supported on a frame of the underwater vehicle.

10. The underwater vehicle as claimed in claim 1, being a remote operated underwater vehicle, ROV.

11. An apparatus comprising:
rigid tubing which comprises at least one extendible pair of tubulars to be supported in position under water, the one tubular of the pair being movable longitudinally relative to the other tubular of the pair, for extending a combined reach of the tubulars;
a motor operable for actuating the extendible pair; and
at least one pump to be coupled to the rigid tubing, the pump to be operable for pumping or suctioning fluid through the pair of tubulars.

12. The apparatus as claimed in claim 11, further comprising at least one underwater connector for connecting with an underwater vehicle for operating the apparatus, the connector being configured to communicate therebetween any one or more of: fluids; electrical current; and data.

13. A system comprising:
the apparatus according to claim 11; and
at least one underwater vehicle.

14. The underwater vehicle as claimed in claim 2, wherein the one tubular comprises a mandrel and the other tubular comprises sleeve.

15. An underwater vehicle for performing an underwater pumping or suctioning operation, the underwater vehicle comprising:
- rigid tubing which comprises at least one extendible pair of tubulars supported on the underwater vehicle, the one tubular of the pair being movable longitudinally relative to the other tubular of the pair, for extending a combined reach of the tubulars;
- at least one pump coupled to the rigid tubing, the pump being operable for pumping or suctioning fluid through the pair of tubulars; and
- parallel pumps which are fluidly connected to a common or intermediate pipe supported on a frame of the underwater vehicle.

16. The underwater vehicle as claimed in claim 15, wherein the rigid tubing is resistant to collapse by a pressure against an exterior of the tubing that is one atmosphere, or more than one atmosphere, greater than inside the tubing.

17. The underwater vehicle as claimed in claim 15, wherein the one tubular comprises a mandrel and the other tubular comprises sleeve.

18. The underwater vehicle as claimed in claim 15, wherein the one tubular comprises or consists essentially of metal cylindrical walling.

19. The underwater vehicle as claimed in claim 15, wherein the one tubular is movable relative to the other by linearly translation.

20. The underwater vehicle as claimed in claim 15, wherein the tubing has an end member for engaging with a connector of an underwater structure.

\* \* \* \* \*